United States Patent [19]

Gibney

[11] 4,277,098
[45] Jul. 7, 1981

[54] FOLDABLE TRUCK CAP ASSEMBLY

[76] Inventor: Lloyd Gibney, 14 E. Cemetery St., Funkstown, Md. 21734

[21] Appl. No.: 943,091

[22] Filed: Sep. 18, 1978

[51] Int. Cl.³ ............................................... B60P 7/04
[52] U.S. Cl. ...................................................... 296/100
[58] Field of Search .................. 296/100, 108, 137 C, 296/137 D, 140, 141, 196, 197, 148, 147, 219, 220

[56] References Cited

U.S. PATENT DOCUMENTS

| 1,521,073 | 12/1924 | Canby | 296/148 |
|---|---|---|---|
| 1,757,860 | 5/1930 | Hall et al. | 296/148 |
| 1,775,539 | 9/1930 | Spiro | 296/148 |
| 3,688,787 | 9/1972 | Feather | 296/100 X |
| 3,820,840 | 6/1974 | Forsberg | 296/100 |
| 3,897,100 | 7/1975 | Gardner | 296/100 X |
| 3,986,749 | 10/1976 | Hull et al. | 296/100 X |

FOREIGN PATENT DOCUMENTS 678447 12/1964 Italy ........................................ 296/100

Primary Examiner—John J. Love
Assistant Examiner—Norman L. Stack
Attorney, Agent, or Firm—Pollock, Vande Sande and Priddy

[57] ABSTRACT

A foldable truck cap assembly for selectively enclosing the bed portion of a pick-up truck or the like, wherein the truck cap assembly includes a plurality of separate cap sections pivotally attached to one another with opposite ends of each cap section being fastened to side window panels extending along opposite sides of the truck bed. Adjacent cap sections are jointed by hinge assemblies, allowing the truck cap to be easily folded into a nested or collapsed configuration for storage on the cap roof when not in use.

15 Claims, 11 Drawing Figures

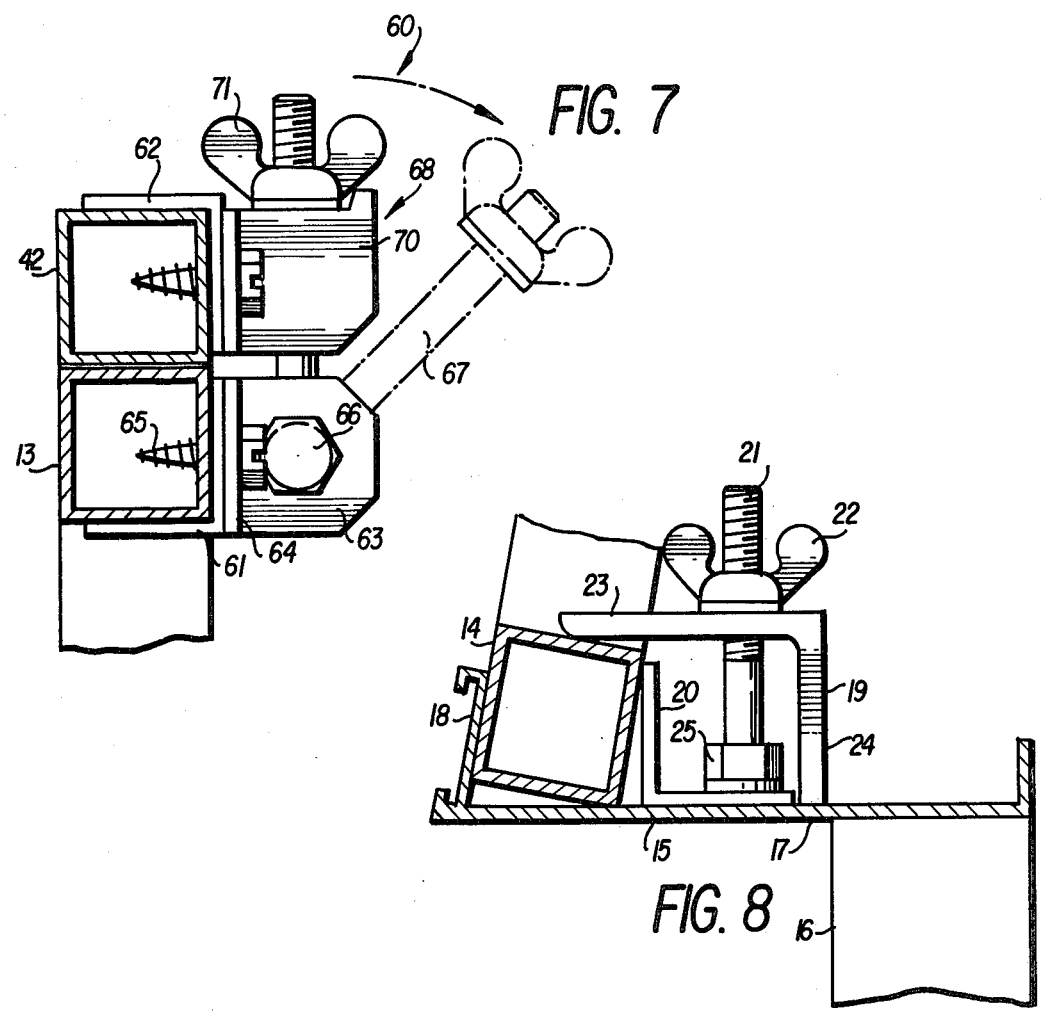

FOLDABLE TRUCK CAP ASSEMBLY

BACKGROUND OF THE INVENTION

The present invention generally relates to a truck cap assembly of the type adaptable for selectively enclosing an open truck bed or the like. In particular, the present invention is directed to a unique truck cap assembly which can be easily pivoted into a folded or collapsed position for storage on the cab roof of the truck when not in use.

Pick up trucks have enjoyed increased popularity in recent years due largely to their unique ability to haul large and bulky cargo. A further advantage of the pick-up truck is the ability to pull large recreational vehicles of the so-called fifth wheel type, which overlap a portion of the truck bed. Yet, the very openness of the truck bed creates a problem, wherein cargo often can not be adequately protected against either adverse weather conditions or unauthorized removal.

In an effort to make open bed vehicles more versatile, the removable truck cap assembly has been employed for use with existing vehicles. Known removable truck cap assemblies have proven less than completely satisfactory, in that known assemblies are generally formed as rigid, one-piece structures which can often weigh in excess of 300 pounds, requiring the services of several strong men for positioning the cap over the truck bed. A further problem associated with rigid one-piece type cap assemblies arises when it becomes desirable to attach or remove the cap as, for example, after a fifth wheel recreational trailer has been detached from the truck at a camp site. Because the rigid, bulky cap can not be easily transported, except on the truck bed, it would not be available for use.

Furthermore, known truck cap assemblies usually employ a plurality of nut and bolt fasteners for engaging the cap to the truck, wherein large torque is necessary for adequately tightening the nuts.

As will be discussed in detail hereinafter, applicant's new and useful invention solves the problems confronting the prior art truck cap assemblies, while at the same time providing an inexpensive and light-weight truck cap assembly which can be folded into a collapsed configuration easily storable on the truck roof when not in use.

OBJECTS AND SUMMARY OF THE PRESENT INVENTION

An object of the present invention is to provide a novel truck cap assembly, wherein a plurality of cap sections are pivotally connected to one another.

A further object of the present invention is to provide a foldable cap assembly, wherein the separate cap sections are selectively positionable adjacent to one another to enclose the open bed portion of a pick-up truck or the like, with the cap sections being selectively foldable into a collapsed position one on top of the other for easy storage on the truck roof when not in use.

A yet further object of the present invention is to provide a truck cap, wherein detachable window panels are attached to the truck bed via a novel fastening assembly, with the cap sections being detachably connected to the window panels.

Another object of the present invention is to provide a truck cap which is light-weight, inexpensive and easy to attach and detach from the truck.

A preferred embodiment of the present invention achieves the above-stated objects with a novel assembly including a pair of window panels which are mounted on slant rails extending along either side of the truck bed. The window panels may be formed of one or more sections and are releasably attached to the slant rails via a plurality of nut and bolt assemblies. A plurality of separate cap sections, preferably three in number, extend between opposite window panel sections, and are positionable adjacent to one another to enclose the bed portion of the truck. Each cap section is constructed of a light weight substantially rigid material such as aluminum or fiberglass, with a plurality of strut members extending along the inside portions of the cap sections to provide additional strength.

A first, interior hinge assembly joins the cap section positioned nearest the truck cab with a second, adjacent cap section. A second, exterior hinge assembly joins the second cap section with a third adjacent cap section positioned nearest the end of the truck. A third hinge assembly extends between a forward frame member attached to the truck bed and the first cap section. Finally, a rear window panel may be pivotally attached to the third cap section for movement therewith. In an alternative embodiment, the rear window panel is detachably joined to the third cap section.

To fold or collapse the novel truck cap from its fully open position, a plurality of fasteners attaching the cap sections to the side window panels are detached. This allows the three cap sections to be folded into a nested position extending over the roof of the truck cab. A transversely extending support member positioned on a forward portion of the cab functions to support an end of the nested cap section. The side window panels are then removed from the truck bed to complete the folding operation of the cap assembly. To enclose the truck bed with the cap assembly, the above-discussed method is merely reversed.

The present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein:

FIG. 7 shows a cross-sectional view of a fastening assembly for joining a cap section to a window panel; and FIG. 8 shows a cross-sectional view of a further fastening assembly for joining a window panel to the truck bed.

DETAILED DESCRIPTION OF A PREFERRED EMBODIMENT

Figure 1:
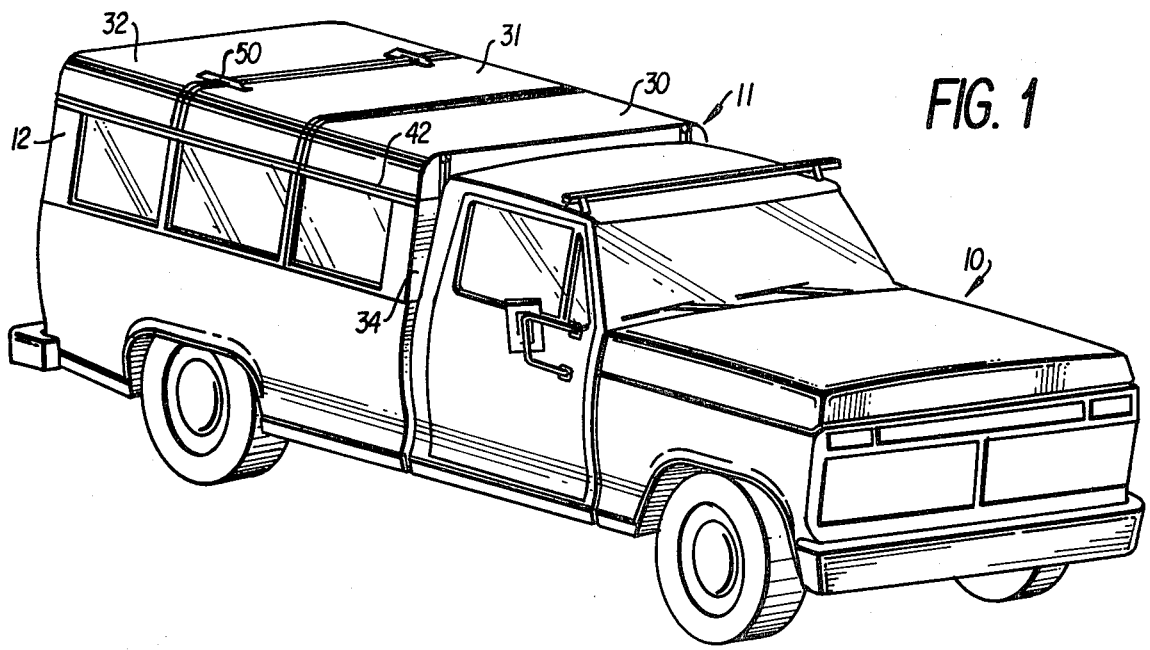
FIG. 1 shows a perspective view of a conventional open bed truck employing a truck cap formed according to the present invention.

Referring to the drawings, and FIG. 1 in particular, an open bed truck is generally designated at 10. Mounted on truck 10 is a truck cap assembly 11 formed in accordance with the present invention.

Figure 2:
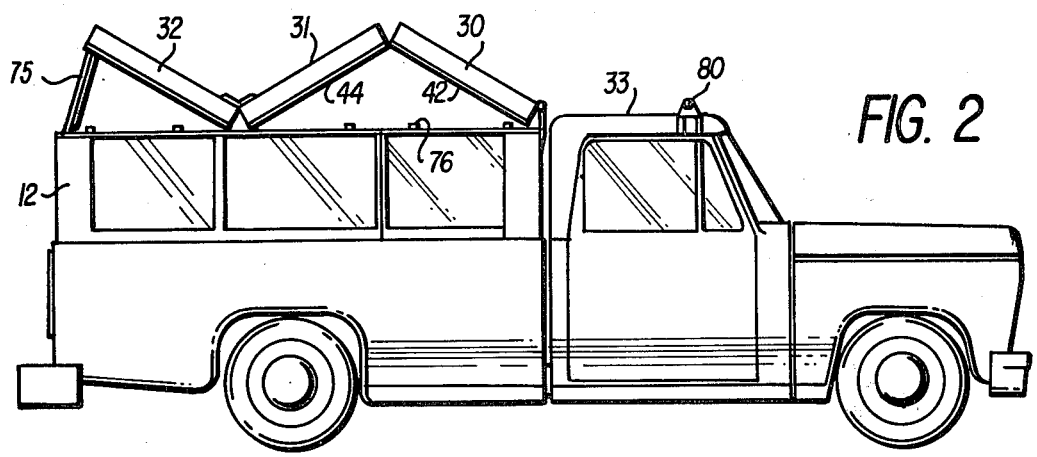
FIG. 2 shows a side view of the truck of FIG. 1, with the truck cap assembly in a partially open position.

Truck cap assembly 11 includes a pair of similarly shaped side window panels, with only one side window panel 12 being visible in FIGS. 1 and 2. Each side window panel 12 may be formed from a plurality of separate window sections detachably connected to one another, or each side window panel 12 may be formed as an integral member. Each side window panel 12 further includes hollow strut-like supports extending along upper and lower surfaces as shown at 13 and 14, respectively, in FIGS. 7 and 8.

A separate, slanted support rail assembly shown at 15 in FIG. 8 is mounted on each of two vertically extending, parallel truck sides 16 defining an open bed portion of truck 10, with support rail assembly 15 being attached to truck side 16 via conventional fasteners such as screws or bolts. Support rail assembly 15 includes a support plate 17 which overlaps truck side 16 and provides a base for lower strut 14 of side window panel 12. An end member 18 is attached to and extends above an end portion of plate 17, with end member 18 and plate 17 forming an acute angle therebetween, while providing a flanged outer support for lower strut 14.

Slant rail assembly 15 further includes a pair of generally L-shaped brackets 19 and 20, with bracket 19 being larger in size than bracket 20. Bracket 20 is formed with an aperture extending therethrough which is alignable with an aperture formed through plate 17. Finally, bracket 19 includes a slot extending through a portion thereof, not shown in FIG. 8, with a bolt 21 extending through the aligned apertures in plate 17, bracket 20 as well as the slot in bracket 19. Wing nut 22 is adaptable for rotation about bolt 21 to press an arm 23 of bracket 19 into contact with strut 14, while pressing a further arm 24 of bracket 19 into contact with plate 17. Strut 14 is retained in an inclined position relative to plate 17, due to contact with member 18, plate 17, bracket 20 and arm 23 of bracket 19. This ensures that the side window panel 12 will maintain its proper position relative to truck side 16. A plurality of separate bracket assemblies 19 and 20 can be spaced longitudinally along plate 17 to secure window panel 12 to plate 17. As will be discussed hereafter, window panel 12 may be easily detached from truck side 16 by merely rotating wing nut 22 sufficiently to allow bracket 19 to be removed from bolt 21. A further nut 25 may also be rotated prior to removal of bracket 20 and side window panels 12.

Referring again to FIGS. 1-3, truck cap assembly 11 includes a plurality of three adjacent substantially rigid cap sections 30-32, with each cap section extending between side window panels 12. Cap section 30 is positioned nearest a cab portion 33 of truck 10 when in the open position as shown in FIG. 1. Cap section 31 is positioned adjacent to cap section 30, with cap section 32 being positioned adjacent cap section 31 when in the open position. Each cap section 30-32 is similarly shaped and includes a plurality of hollow strut-like members extending along its edge portions. Furthermore, additional strut-like members may extend adjacent inside surfaces of each cap section 30-32 to provide additional strength thereto.

Figure 3:
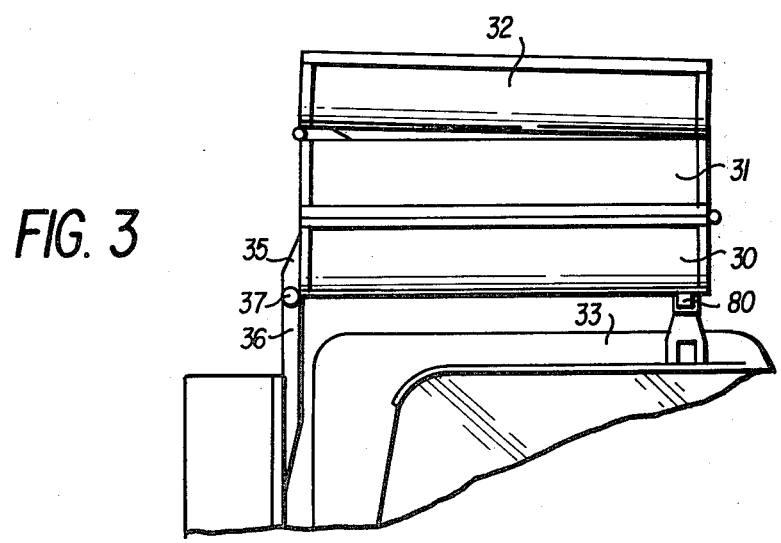
FIG. 3 shows a partial side view of the truck of FIG. 1, with the truck cap assembly in a fully closed or nested position.

As best shown in FIGS. 3 and 4, a frame member 34 is attached to and extends above a transversely extending forward end portion of the truck bed. Frame member 34 extends parallel to truck cab 33 and includes a pair of attached hinge assemblies 35.

Figures 4A, 4B:
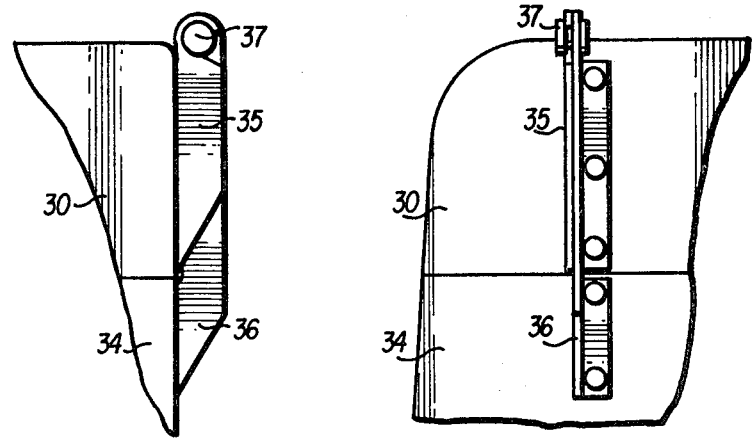
FIGS. 4A and 4B show side and end views, respectively, of the hinge assembly extending between the cap sections and a frame support.

Each hinge assembly 35 includes a first arm 36 attached to frame 34 via a plurality of threaded fasteners and each hinge assembly 35 includes a second arm 37 attached to cap section 30 via a plurality of threaded fasteners. A hinge pin 38 pivotally joins arms 36 and 37. While threaded fasteners are shown in FIG. 4B, it is considered within the scope of the present invention to substitute other types of fastening assemblies such as welding for the threaded fasteners employed herein. It is also considered within the scope of the present invention to employ any number of hinge assemblies in place of the two hinge assemblies described herein.

Figure 6A:
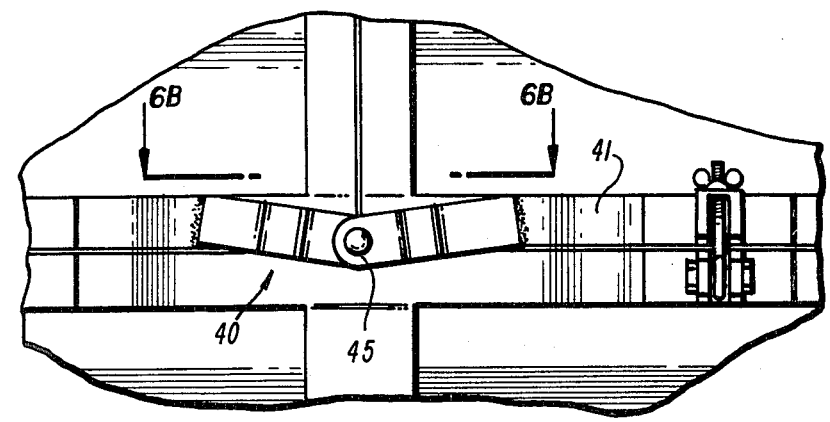
FIGS. 6A and 6B show side and top views, respectively of a further hinge assembly joining a further two cap sections.
Figure 6B:
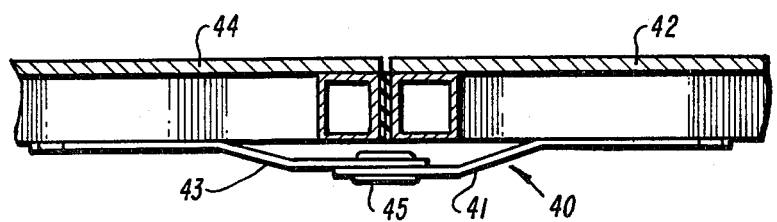

Cap sections 30 and 31 are pivotally joined to one another by a pair of interior hinge assemblies, with one of the hinge assemblies being shown at 40 in FIGS. 6A and 6B, respectively. Because each hinge assembly 40 is similar, a view and description of one hinge assembly is considered sufficient for a complete understanding of the present invention. Hinge assembly 40 comprises a first hinge arm 41 attached to an interior side strut 42 of cap section 30. A second hinge arm 43 is attached to an interior side strut portion 44 of adjacent cap section 31. Hinge arms 41 and 43 are pivotally joined together by pin 45. As will be described hereafter, hinge assembly 40 allows cap sections 30 and 31 to be pivoted relative to one another to open or close truck cap assembly 11. Hinge assembly 40 also ensures that cap sections 30 and 31 remain in fluid tight abutment with one another to prevent water or the like from leaking through the open truck cap assembly.

Figures 5A, 5B:
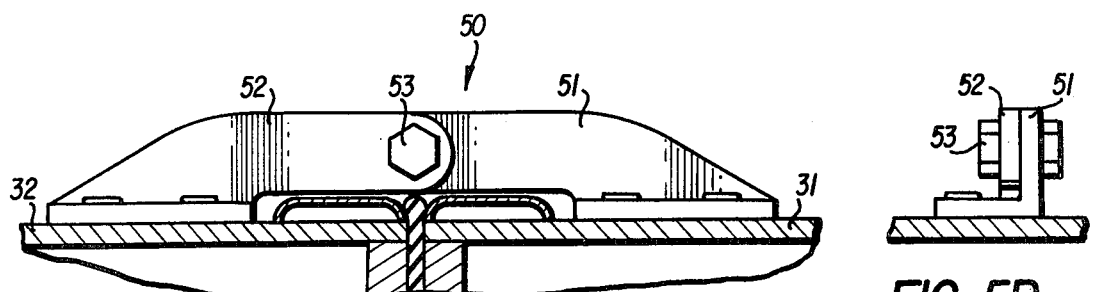
FIGS. 5A and 5B show side and end views, respectively, of a hinge assembly joining two cap sections.

Cap sections 31 and 32 are joined one to the other by a pair of exterior hinge assemblies 50, which are best shown in FIGS. 5A and 5B. Because each exterior hinge assembly 50 is similar, a description of one such assembly is considered sufficient for a proper understanding of the present invention.

Hinge assembly 50 includes a first hinge arm 51 attached to cap section 31 and a second hinge arm 52 attached to cap section 32. In particular, each exterior hinge assembly 50 is positioned along a generally flat, central portion of cap sections 31 and 32, respectively. Hinge arm 51 is aligned with a strut-like member 53 extending longitudinally inside of cap section 31, while hinge arm 52 is similarly aligned with a strut-like member 54 extending longitudinally within cap section 32. A plurality of threaded fasteners extend through strut member 53, cap section 31 and a flanged end portion of hinge arm 51, while a further plurality of threaded fasteners extend through strut 54, cap section 32 and a flanged end portion of hinge arm 52. A pin member 55 pivotally joins hinge arms 51 and 52 for relative rotation in a manner to be explained.

Referring to FIG. 7, a fastening assembly 60 is shown for attaching each of the cap sections 30-32 to opposite side window panels 12. In particular, a first L-shaped bracket 61 is attached, as for example by welding, to strut-like portion 13 of side window panel 12. A further L-shaped bracket 62 is also attached, as for example by welding, to an interior side strut 42 of cap section 30. A pair of spaced plate members 63, only one of which is shown in FIG. 7, are mounted on a support member 64 which is, in turn, attached to bracket 61 via a conventional threaded fastener 65. A bolt member 66 extends through aligned apertures formed in plate members 63, with a separate eye bolt 67 being pivotally mounted on bolt member 66.

Fastener assembly 60 further includes a support assembly 68 attached via threaded fastener 69 to bracket 62. Support assembly 68 may include a first plate member 70 extending parallel to plate 63 with plate member 70 having a slot positioned for allowing eye bolt 67 to extend completely through plate 70. A wing nut 71 is rotatably mounted on eye bolt 67 and may be rotated to lock plates 68 and 63 against any relative movement, thereby locking cap section 30 to side window panel 12 as shown by the solid bolt in FIG. 7. If wing nut 71 is rotated in an opposite direction, eye bolt 67 may be pivoted about bolt 66 out of the slot formed in support assembly 68 as shown by the dotted bolt in FIG. 7.

A plurality of similarly formed fastener assemblies 60 are spaced along each side window panel 12 and function to detachably join each of the cap sections 30-32 to side window panels 12. As stated herebefore, each side window panel 12 may be formed as an integral structure or a plurality of separate window sections may be joined to one another to form each panel 12. If a plurality of sections are used, a plurality of fastener assemblies 60 may be employed to join the sections into a unitary member. Each window section would include a strut-like end portion extending in a generally vertical direction, with the end portions of adjacent window sections abutting one another and functioning to support brackets 61, 62 as well as support assemblies 63 and 68, respectively.

The novel truck cap assembly 11 formed according to the present invention may further include an end window panel 75 which is pivotally attached at an upper end to cap section 32 as shown in FIG. 2. In an alternative embodiment, end window panel 75 may be detachably attached to cap section 32, allowing for complete separation from cap sections 30-32 as desired. Finally, a plurality of guide posts 76 are spaced along side window panels 12, with each guide post mating with an aperture formed in cap sections 30-32 to ensure proper placement of the cap sections for complete enclosure of the truck bed.

A description of the procedure for opening and closing the truck cap 11 will follow hereafter, with reference being had to FIGS. 1-3 in particular.

When it is desired to remove truck cap 11 from enclosing the open bed of truck 10, the first step is to disengage fastener assemblies 60 by loosening wing nuts 71 and rotating eye bolts 67. Once fastener assemblies 60 have been disengaged, cap section 32 can be pivoted toward cap section 31 due to exterior hinge assembly 50 extending therebetween. As cap section 32 is pivoted, rear window panel 75 is also pivoted into contact with an interior portion of cap section 32. The combination of cap sections 32 and 31 is then pivoted toward cap section 30 as shown in FIG. 2, due to interior hinge assemblies 40.

The combination of cap sections 30-32 forms a collapsed or nested configuration which can be easily pivoted onto truck cab 33 via hinge assemblies 35. A transversely extending support bar 80 is attached to a forward end of cab 33 and provides support for the forward end of nested cap sections 30-32 as clearly shown in FIG. 3.

Once cap sections 30-32 have been folded into the nested position, wing nut 22 may be rotated to loosen brackets 19 and 20, allowing lower strut portions 14 of window panels 12 to be removed from slant rails 15. Once the cap sections 30-32 have been folded into the nested position on top of cab 33, conventional fasteners such as tie ropes may be extended about cap sections to prevent accidental movement of the cap assembly during operation of the truck. Alternatively, conventional fasteners may be eliminated, with the weight of the cap sections providing sufficient force to prevent any accidental movement.

To enclose the open bed of truck 10 with the novel truck cap of the present invention, a reversal of the above-described procedure is followed. Firstly, the side window panels 12 are positioned on and attached to slant rail assembly 15 via a plurality of pairs of brackets 19, 20 and associated hinge structure. Cap sections 30-32 are then pivoted about hinge assemblies 35, with the individual cap sections being pivoted into positions adjacent one another. Finally, the cap sections are attached to window panels 12 via a plurality of spaced fastener assemblies 60.

While the preferred embodiment discusses a truck cap assembly formed with three separate cap sections, it is within the scope of the present invention to employ any number of cap sections which are alternately attached by exterior and interior hinge assemblies, allowing the cap sections to be folded into a collapsed configuration when not in use. Likewise, the side window panels 12 may include one or a plurality of separate sub-sections which are joined to form a complete panel assembly.

While known one-piece truck cap assemblies can weigh as much as 300 pounds, the heaviest weight which must be lifted when installing applicant's novel truck cap is the weight of the cap sections, which is approximately 100 pounds. Of course, the actual weight of the sub-assembly may vary somewhat, depending on whether metal, fiberglass or some other material is employed.

The present invention is not limited to the above-described embodiments, but is limited only by the scope of the following claims.

I claim:

1. A foldable truck cap assembly for selectively enclosing an open bed portion of a pick-up truck or the like and comprising:

first and second similarly shaped side window assemblies ach mounted on a separate, longitudinally extending truck panel forming opposite sides of said open truck bed;

fastening means for detachably connecting each of said first and second window assemblies to a respective opposite side panel;

a plurality of at least three separate, substantially rigid cap section assemblies each extending between said first and second side window assemblies and positioned adjacent to one another for selectively enclosing said open truck bed;

hinge assembly means extending between and engaging confronting surface portions of said adjacently disposed, substantially rigid cap sections for pivotally joining said substantially rigid cap sections to one another, whereby said pivotally attached substantially rigid cap sections are selectively foldable into a stacked configuration to uncover said open truck bed; and, said hinge assembly means comprising a first hinge assembly connecting an interior side portion of a first substantially rigid cap section nearest said truck cab with an interior side portion of an adjacently disposed substantially rigid cap section, and said hinge assembly means further comprising a second hinge assembly connecting an exterior central wall portion of said adjacent substantially rigid cap section with an exterior central wall portion of a further substantially rigid cap section, whereby said interior hinge assembly allows said cap sections attached thereto to pivot substantially away from said truck bed and said exterior hinge assembly allows said cap sections attached thereto to pivot substantially toward said truck bed, forming said stacked configuration.

2. A truck cap assembly according to claim 1, wherein said hinge means comprises at least one hinge assembly extending between a cap section positioned nearest said truck cab and a frame member attached to a forward portion of said truck bed and extending substantially parallel to said truck cab.

3. A truck cap assembly according to claim 2, wherein said hinge means comprises a pair of spaced hinge assemblies each extending between said cap section positioned nearest said truck cab and said frame member.

4. A truck cap assembly according to claim 1, wherein said first and second side window assemblies are each formed as a one-piece structure.

5. A truck cap assembly according to claim 1, wherein said first and second side window assemblies are each formed from a plurality of separate window sections detachably connected to one another.

6. A truck cap assembly according to claim 1, wherein said first and second side window assemblies each include hollow strut-like members extending along upper and lower surfaces thereof.

7. A truck cap assembly according to claim 6, wherein said fastening means comprises separate plate members detachably mounted on each of said longitudinally extending truck panels, with each plate member including a flanged end portion forming an acute angle with said respective plate member;

said fastening means further comprising a pair of substantially L-shaped brackets with a bolt assembly extending through aligned openings in said plate and both of said brackets, wherein:

selective rotation of a nut member on said bolt forces said brackets to contact and press the lower strut portion of said side window into abutting contact with said flanged end portion of said plate to incline said spaced window assemblies toward one another.

8. A truck cap assembly according to claim 7, wherein said opening in one of said L-shaped brackets comprises a slot extending partially therethrough, allowing said bracket to be pivoted and removed from contact with said bolt upon selective rotation of said nut.

9. A truck cap assembly according to claim 1, wherein a separate rear window assembly is attached to one of said cap sections for joint movement therewith.

10. A truck cap assembly according to claim 1, wherein additional fastening means selectively detachably connect said cap sections with said side window assemblies.

11. A truck cap assembly according to claim 10, wherein said additional fastening means comprises:

aligned substantially L-shaped brackets attached to adjacent hollow strut portions formed on said side window assemblies and each of said cap sections, respectively;

support assemblies attached to each of said L-shaped brackets, with one support assembly having an eye bolt pivotally attached thereto, and said remaining support assembly having a slot extending partially therethrough.

12. A truck cap assembly according to claim 11, wherein said further fastening means comprises a plurality of spaced pairs of L-shaped brackets, support assemblies and pivotally attached eye bolts for detachably joining said cap sections to said side wall assemblies.

13. A truck cap assembly according to claim 1, wherein a plurality of spaced guide posts extend from each of said side wall assemblies into mating apertures formed in said cap sections to provide proper alignment therebetween.

14. A truck cap assembly according to claim 1, wherein said attachment means comprises at least one hinge assembly means extending between each adjacent cap section.

15. A truck cap assembly according to claim 3, wherein a support bar assembly extends transversely across a forward portion of said truck cab, with said support bar contacting and supporting said folded cap sections.

* * * * *